United States Patent [19]

Bitsch et al.

[11] Patent Number: 4,550,664
[45] Date of Patent: Nov. 5, 1985

[54] TRACK WHEEL BLOCK

[75] Inventors: Harald Bitsch, Witten; Klaus Donner, Hagen; Heinz Hasselmann, Hagen-Emst; Rainer Horbach, Witten, all of Fed. Rep. of Germany

[73] Assignee: Mannesmann Aktiengesellschaft, Dusseldorf, Fed. Rep. of Germany

[21] Appl. No.: 674,489

[22] Filed: Nov. 26, 1984

[30] Foreign Application Priority Data

Sep. 2, 1981 [DE] Fed. Rep. of Germany ....... 3134750

[51] Int. Cl.[4] .................. B66C 23/04; B61D 1/00
[52] U.S. Cl. ................................ 105/180; 212/271; 104/1 A; 105/163 R; 105/181
[58] Field of Search ............... 105/163 R, 180–181, 105/150; 104/1 A, 93; 212/171, 205, 209, 271; 16/98

[56] References Cited

U.S. PATENT DOCUMENTS

| 569,965 | 10/1896 | Ferris | 16/98 |
| 581,710 | 5/1897 | Gardner | 16/98 |
| 809,695 | 1/1906 | Keil | 16/98 |
| 1,734,326 | 11/1929 | Chesnutt | |
| 3,739,424 | 6/1973 | Gonsalves et al. | 16/98 |
| 4,109,343 | 8/1978 | Weis et al. | 16/98 |
| 4,385,562 | 5/1983 | Bitsch et al. | 105/163 R |

FOREIGN PATENT DOCUMENTS

| 348200 | 2/1979 | Austria . | |
| 659141 | 5/1965 | Belgium . | |
| 1859347 | 8/1962 | Fed. Rep. of Germany . | |
| 33005 | 8/1962 | Fed. Rep. of Germany . | |
| 2319187 | 10/1974 | Fed. Rep. of Germany . | |
| 2715140 | 10/1978 | Fed. Rep. of Germany | 295/36 A |
| 2758426 | 5/1979 | Fed. Rep. of Germany | 105/163 R |
| 2842417 | 4/1980 | Fed. Rep. of Germany . | |
| 2953391 | 11/1980 | Fed. Rep. of Germany . | |
| 2386472 | 4/1978 | France . | |
| 1098146 | 1/1968 | United Kingdom | 105/163 R |

Primary Examiner—Trygve M. Blix
Assistant Examiner—R. B. Johnson
Attorney, Agent, or Firm—Mandeville and Schweitzer

[57] ABSTRACT

A track wheel has an axially extended hollow hub with internally directed gear teeth capable of receiving an outer toothed driving shaft. The hub is supported by roller bearings in a bearing box from which the wheel may not be inadvertently removed once the box halves have been welded together. The sides of the bearing box have bores in appropriate locations which serve to allow the box to be fastened in a variety of configurations to the element to be transported by the track wheel. The side surfaces of the two halves of the bearing box are provided with recesses for flush and precise arrangement of the roller bearings such that the box can be flushly mounted to other elements. The roller bearings are secured within the recesses by means of snap rings which fit into annular slots located on the outer cylindrical surfaces of the hub.

5 Claims, 9 Drawing Figures

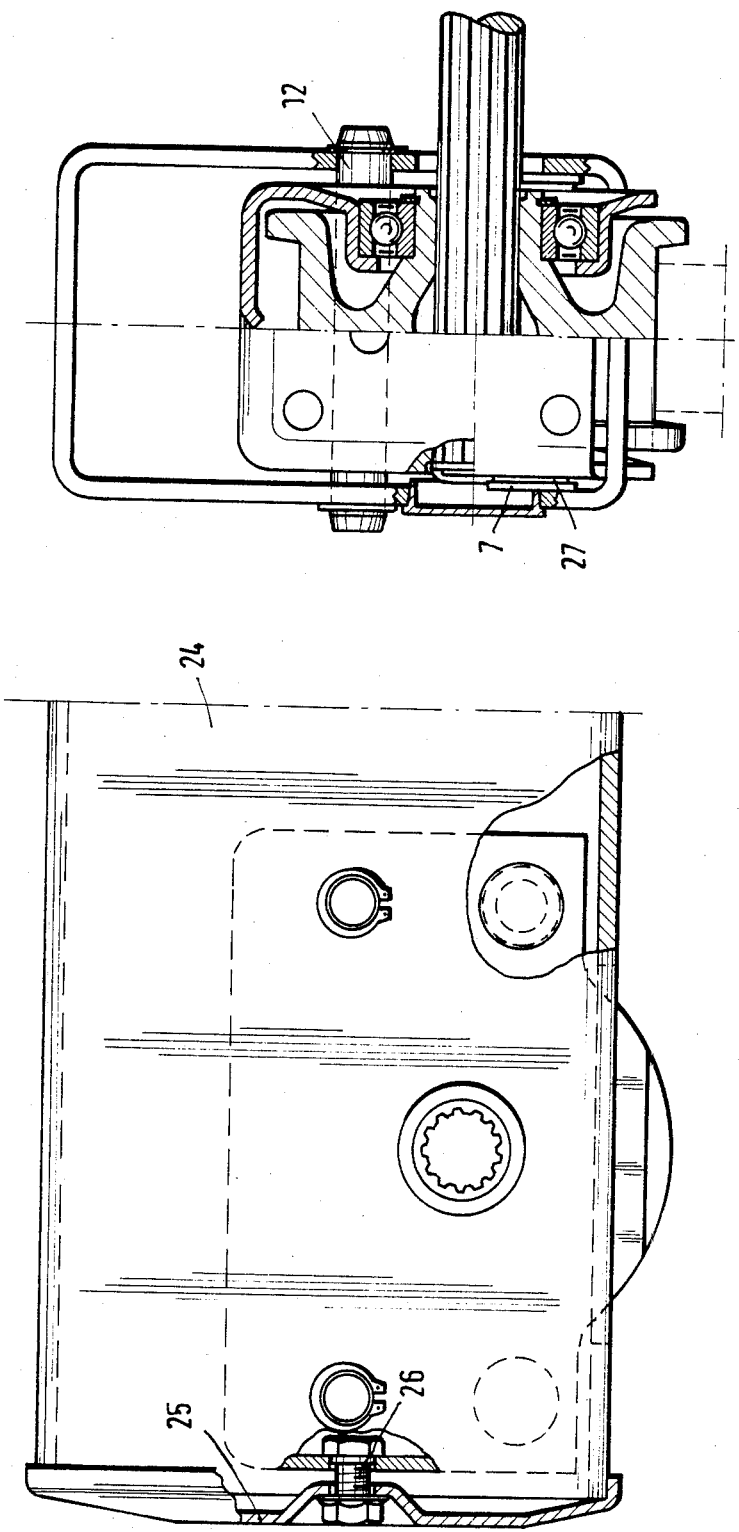

TRACK WHEEL BLOCK

This is a continuation of application Ser. No. 409,638, filed Aug. 19, 1982, now abandoned.

The invention is directed to a track wheel block with bearing box formed by two welded-together halves, in which a track wheel is supported by means of bearings.

BACKGROUND OF THE INVENTION

A track wheel block for crane carrying wheels is discussed in German reference No. DE-OS 29 53 391 and has an axle which is installed in the track wheel and supported by roller bearings in the bearing block. This track wheel block is unnecessarily expensive because of the required axle. The German reference AT-PS No. 348 200 discloses a track wheel, the hub of which is installed with roller bearings and bearing bodies on counter bearings of a crane vehicle. This arrangement, too, is unnecessarily expensive because of the required bearing bodies and counter bearings. Track wheel blocks have previously been manufactured only for certain particular types of installation.

SUMMARY OF THE INVENTION

The object of the present invention is, therefore, to create an economical and multi-purpose track wheel block. This object is achieved by the novel track wheel block of the present invention. This novel track wheel block has a hollow hub extending on both sides through roller bearings installed in the bearing box. The body portions of the bearing box are welded together only after the track wheel has been installed. In a preferred embodiment, these portions comprise symmetrical halves. The finished unit is useful for many transportation requirements, is extremely economical, and may be replaced without difficulty, after the track wheel is worn out. When the wheel is replaced, the bearing box would usually also be replaced, since its proportionate cost is only approximately 20% of the cost of the track wheel block. In view of this, the expenditure in labor to save it for re-use is uneconomical.

In a further development of the invention, the hub is provided with a receiving opening to accommodate a drive shaft, and the receiving opening may have an inner gear for mating with an outer gear of the drive shaft, on which the secondary drive shaft of a transportion drive is installed. The inner gear otherwise longitudinaly extending along the length of the hollow hub is provided with a centrally located expansion area. The expansion area is primarily of technical advantage in production. Two relatively narrow interior gears are far easier and economical to manufacture than one long gear extending through the length of the hollow hub. This is because the metallic chips necessarily removed during machining hinder the production process.

The hollow hub preferably and advantageously has outer cylinder surfaces on both sides of the track wheel and annular slots in the outer rings to receive snap rings lying against the outer surface of the bearings. A free space may be present between the flange of the wheel and the inside surfaces of the bearing boxes having a preferred width of at least half a bearing. This free space allows the track wheel to be easily laterally displaced within the bearing box after the snap rings are released. Then the relatively inexpensive roller bearings may be easily replaced whenever a bearing fails.

In a further development of the invention, the bearing box may have, at the side connecting surface, which contacts the element to be transported, recessed sections surrounding indented bearing races. These sections are deep enough so that the hub, extending beyond the snap rings, does not protrude beyond the side connecting surface of the bearing box. The track wheel block may therefore lie with its side connecting surface directly against the element to be transported. The recessed sections of the bearing box preferably has flanged contact surfaces for positively and precisely locating the bearings connected to the bearing cylinder surfaces, thereby firmly supported said bearings axially between these contact surfaces and the snap rings.

A yet further aspect of the invention is that there are stress relief recesses, at the corners between the front and side connecting surfaces, so that even a track wheel block made of relatively thin metal sheet has the necessary rigidity. In this manner, the bearing box could be subjected to minor deformation without impairing the free-rolling functioning of the wheel itself. The halves of the bearing box preferably have at least at some of the welded joints in seam recesses, so that the welding seams do not protrude beyond the connecting surfaces. Thus, the joints do not need to be processed after welding. A seam recess is required above the track wheel. However, in front of and behind the track wheel and at the front surfaces of the bearing box, the welding seams may be welded, from inside, through the track wheel opening, without preparation or subsequent processing, after turning over the bearing box.

The bearing box, in yet another development of the invention, has at its connecting surfaces bores for either tubular spacer elements as described in U.S. Pat. No. 4,385,562 or support bolts and screws with which the carrying wheel block is fixed to the element intended to be transported. The tubular spacer elements prevent the bearing box from being compressed if screws are used. This would be used, for example, for cranes, their top girders, steel structures for rail-guided machines, turntables, floor conveyor-vehicles, etc.

Several exemplary embodiments of the novel track wheel block invention are represented in the drawings and reference should be made to the drawings and the subsequent discussion for a more complete understanding of the broad inventive concept.

BRIEF DESCRIPTION OF THE DRAWINGS

FIG. 3 is a side view, partially in cross section, of the novel track wheel block of the present invention, mounted on the top girder of a crane.

FIG. 4 is a front view of the track wheel block of FIG. 3.

DETAILED DESCRIPTION OF THE INVENTION

Figure 1:
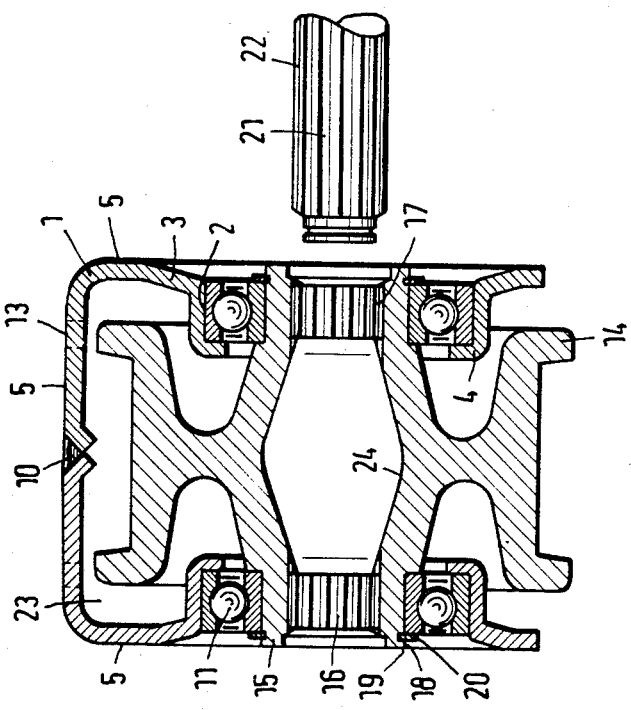
FIG. 1 is a vertical cross sectional view of a novel track wheel block embodying the present invention.

In FIG. 1, the two symmetrical halves of the bearing box 1 are connected with each other from the inside on top, in the area of a welded-seam recess 10, and at the front by welding seams which are not visible. The side connecting surfaces 5 of the two halves of the bearing box 1 have recessed sections 3, within which are adjacent bearing radial support surfaces 2 and axial support surfaces 4 for installed roller bearings 11. The roller bearings 11 are secured by means of snap rings 20 being selectively inserted into slots 19 of outer cylindrical surfaces 18 of the hollow hub 15. The bearing box 1 has stress relief sections 9 between the front and side connecting surfaces 5. The wheel 14 has, of course, a track riding surface for riding over a track or, if the wheel is used to support a load (see FIG. 9) a load supporting surface. It should be clearly understood that the versatility of the present wheel block housing resides in the ability of the block to be easily attached on any one of five available sides to another member sought to be transported. The two sides, the front and back and the top, as seen in FIGS. 1 and 2, are capable of being directly and flushly attached to another member.

The hollow hub 15 of the carrying wheel 14 has a receiving opening 16 within which there is an inner gear 17 for matingly receiving an outer gear 22 of a drive shaft 21. The drive shaft 21 connects the track wheel 14 with the drive (not illustrated). A ring-shaped enlargement or expansion area 24 of the receiving opening 16 subdivides the inner gear 17 into two short-in-width interiorly directed gear teeth sections. A free space 23 between inside surface of the side surface of the housing and the track wheel flange, allows the track wheel 14 to be laterally displaced in the gear box 1 for easy replacement of the roller bearing 11. This lateral shifting provides a space between the wheel and bearing and is necessary to allow a tool to grab the roller bearings in order to remove them. In this embodiment, the end of the track riding surface of wheel 14 is the flange 13.

Figure 2:
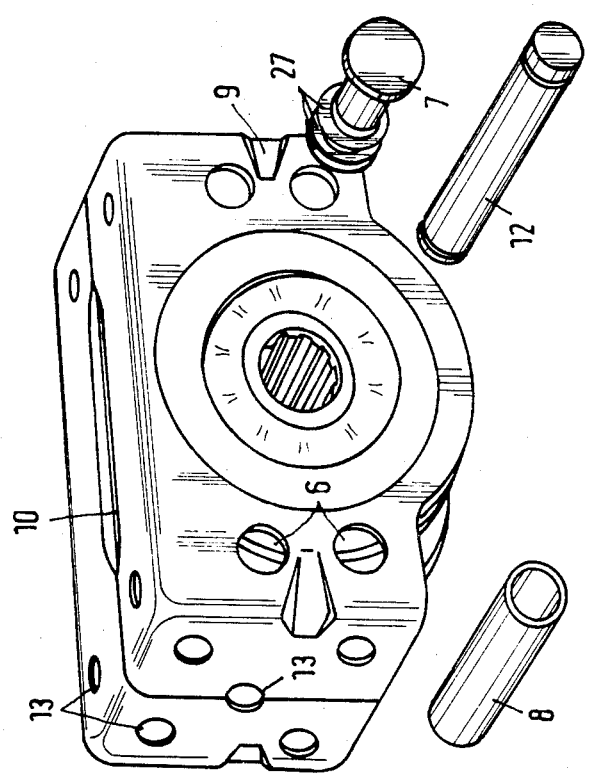
FIG. 2 is a perspective view of the track wheel block of FIG. 1.

Receiving bores 6 and support bolts 12 are shown in FIG. 2. With these elements, the track wheel block may, for example, be mounted on the top girder of a crane, as in FIGS. 3 and 4. A front plate 25 is fastened with a screw and setting nut 26 to the track wheel block enclosing the end of the top girder. In order to adjust the track wheel block laterally, spacer disks 27 are arranged on both sides, as shown in FIGS. 2 and 4, which are supported by plastic knobs 7.

Figure 6:
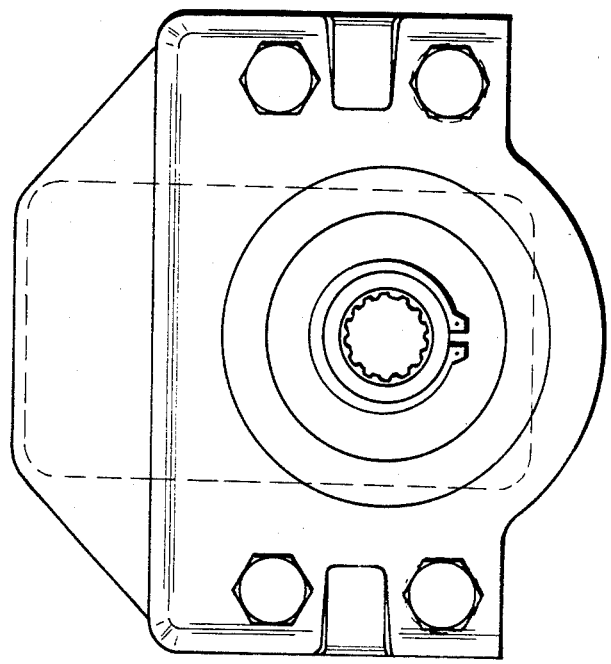
FIG. 6 is a side view of the track wheel block of FIG. 5.
Figure 5:
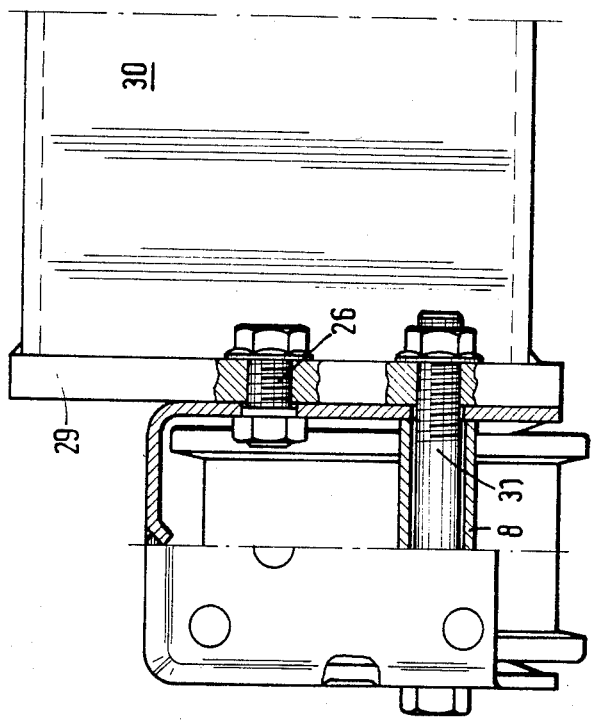
FIG. 5 is a front view, partly in cross section, of the novel track wheel block of the present invention, mounted to the front plate of the traverse of a machine.

In the exemplary embodiment shown in FIGS. 5 and 6, the track wheel block is fastened by means of screws 26 and setting nuts to a front plate 29 of a traverse 30 of a machine. Additional fastening screws 31 are guided through receiving bores 6 and spacing sleeves 8, which are fitted between the lateral connecting bores 5, preventing the track wheel block from being compressed.

Figure 8:
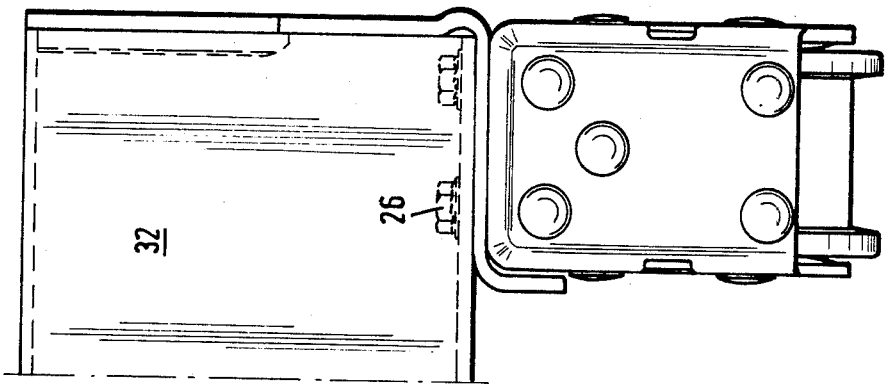
FIG. 8 is a front view of the track wheel block of FIG. 7.
Figure 7:
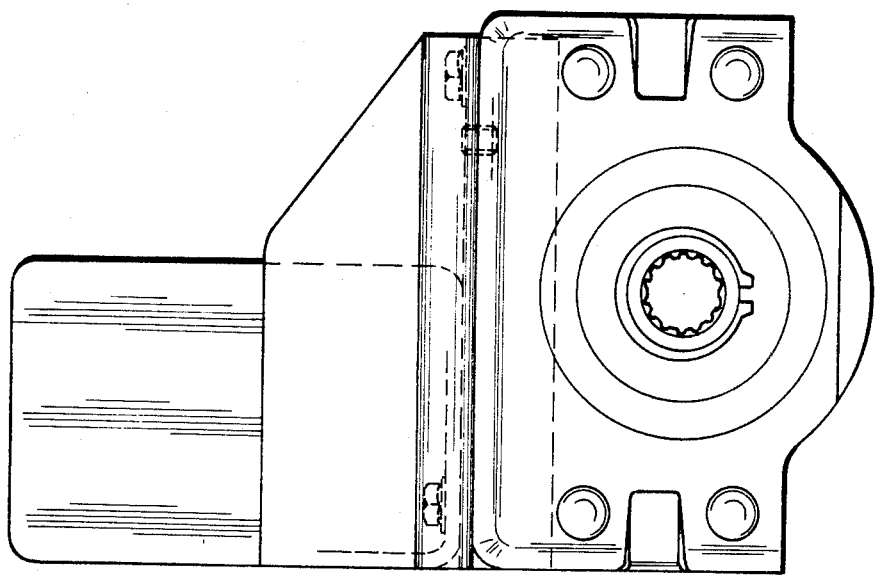
FIG. 7 is a side view of the novel track wheel block of the present invention fastened beneath a machine support.

The exemplary embodiment shown in FIGS. 7 and 8 shows the track wheel block fastened beneath a machine support 32 by means of screws 26 and setting nuts reaching into receiving bores 13.

Figure 9:
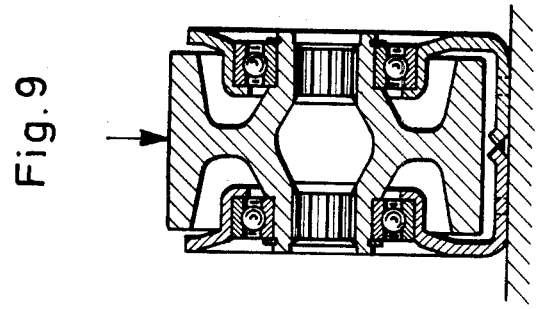
FIG. 9 is a front cross sectional view of the novel track wheel block of the present invention serving as a supporting roll.

In the exemplary embodiment shown in FIG. 9, the track wheel block serves as supporting roll roller for a device located above the wheel. In this embodiment, space 23 is the distance between the inside of the housing and the end of the wheel where the track riding surface begins.

It should be understood, of course, that the specific forms of the invention herein illustrated and described are intended to be representative only, as certain changes may be made therein without departing from the clear teachings of the disclosure. Accordingly, reference should be made to the following claims in determining the full scope of the invention.

We claim:
1. A track wheel block comprising:
   (a) a track wheel having a lateral riding surface;
   (b) said track wheel having a central hollow hub with an external cylindrical surface extending laterally beyond said track riding surface;
   (c) a pair of roller bearings means rotatively supporting said cylindrical surface of said hollow hub;
   (d) means for retaining said roller bearings means fixed with respect to said hub;
   (e) a bearing box comprised of two substantially equal sized wall means welded together, said bearing box having front, back, sides and top surfaces that substantially enclose a significant portion of said track wheel;
   (f) recesses mounted in each of said side surfaces of said wall means and adapted to receive said bearing means;
   (g) a toothed driving gear, said hollow hub including an interior cylindrical surface with teeth for receiving said toothed driving gear to drive said track wheel;
   (h) said roller bearing retaining means including annular slots in said external cylindrical surface of said hollow hub and removable snap rings which fit within said slots;
   (i) a space is provided between said track riding surface and the inside walls of said bearing box sufficient to allow lateral shifting of said track wheel when one of said roller bearing retaining means is removed; and
   (j) a plurality of bores in the respective surfaces of said bearing box to enable said bearing box to be selectively connected to another element.
2. A track wheel block as claimed in claim 1, wherein:
   (a) said hollow hub is provided with a central enlargement area.
3. A track wheel block as claimed in claim 1, wherein:
   (a) said hub laterally extends beyond said roller bearings.
4. A track wheel block as claimed in claim 1, wherein:
   (a) said space is at least equal to one-half of the width of said roller bearings.
5. A track wheel block as claimed in claim 1, wherein:
   (a) said recessed sections are sufficiently deep so that said roller bearings do not interfere with the flush mounting of said bearing box to another element.

* * * * *